United States Patent Office 3,376,289
Patented Apr. 2, 1968

3,376,289
NOVEL 5,6 - DIHYDRO - 6 - OXO - PYRIDO[2,3-b] [1,4]BENZOXAZEPINES AND PROCESS FOR THEIR PREPARATION
Günther Schmidt, Biberach an der Riss, Germany, assignor to Boehringer Ingelheim G.m.b.H., Ingelheim am Rhein, Germany, a corporation of Germany
No Drawing. Filed Mar. 9, 1965, Ser. No. 438,374
Claims priority, application Germany, Mar. 20, 1964, T 25,870
21 Claims. (Cl. 260—239.3)

This invention relates to a novel group of heterocyclic fused-ring compounds, namely, 5,6-dihydro-6-oxo-pyrido[2,3-b][1,4]benzoxazepines, as well as to a process for preparing these compounds.

More particularly, the present invention relates to 5,6-dihydro-6-oxo-pyrido[2,3-b][1,4]benzoxazepines of the formula

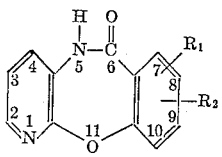
(I)

wherein $R_1$ and $R_2$, which may be identical to or different from each other, are hydrogen, halogen, lower alkyl, lower alkoxy, hydroxyl, acyloxy, amino, acylamino or acyl, or, together with each other and adjacent carbon atoms of the benzo-moiety to which they are attached, may form an aromatic ring fused to said benzo-moiety, especially a fused benzene ring.

A compound of the group embraced by Formula I may be prepared by reacting a 2-halo-3-amino-pyridine of the formula

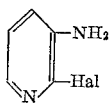
(II)

wherein Hal is a halogen, with a reactive derivative of a salicylic acid compound of the formula

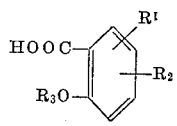
(III)

wherein $R_1$ and $R_2$ have the same meanings as in Formula I and $R_3$ is hydrogen or a protective group for phenolic hydroxyl, such as acyl or p-toluene sulfonyl. Examples of suitable reactive derivatives of a salicylic acid compound of the Formula III are its alkyl or aryl esters, its acid halides or anhydrides and the like. In the event that $R_1$ and $R_2$ are hydroxyl or amino, they are advantageously protected with a protective group, such as acyl, prior to the performance of the reaction.

The reaction between Compound II and the reactive derivative of Compound III is carried out at a temperature above 150° C. and, if desired, in the presence of an inert organic solvent having a relatively high boiling point, such as tetrahydronaphthalene, trichlorobenzene, decahydronaphthalene and the like.

If the two functional groups of the salicylic acid compound of the Formula III react equally as rapidly, such as when the carboxyl group is esterified and $R_3$ is hydrogen, the desired end product of the Formula I is formed right away.

On the other hand, however, if the reactive moiety of the carboxyl group reacts substantially more rapidly than the radical $R_3$, such as when the reactive derivative of the salicylic acid compound of the Formula III is an acid halide and $R_3$ is hydrogen or acyl, an intermediate compound of the formula

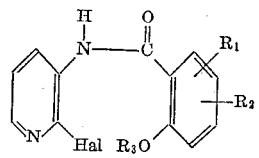
(IV)

wherein $R_1$, $R_2$ and $R_3$ have the same meanings as in Formula I and Hal is halogen, is formed initially at a temperature between 0 and 150° C. This intermediate product does not need to be isolated; instead, the reaction mixture containing it merely needs to be heated to a temperature above 150° C., preferably in the presence of a strong base and in the presence or absence of an inert solvent having a relatively high boiling point, to effect ring closure of the oxazepine ring and thereby form the desired end product of the Formula I.

In the event that the above-described reaction yields a compound of the Formula I wherein either or both of substituents $R_1$ and $R_2$ are hydroxyl or amino, these may subsequently be acylated pursuant to known acylation methods. Conversely, if either or both of substituents in the end product of the Formula I are acyloxy or acylamino, they may subsequently be converted into hydroxyl or amino substituents, respectively, by known methods.

It is entirely surprising that a pyrido[2,3-b][1,4]benzoxazepine of the Formula I is readily obtained in a single reaction step by reacting a 2-halo-3-aminopyridine of the Formula II with a reactive derivative of a salicylic acid compound of the Formula III. Moreover, the smooth progress of the ring closure in intermediate product IV could in no way have been predicted, since such a ring closure reaction had never before been described in connection with known oxygen-containing heterocycles of comparable structure, such as azaphenoxazines and the like.

The following examples further illustrate the present invention and will enable others skilled in the art to understand it more completely. It should be understood, however, that the instant invention is not limited to the particular examples given below.

Example 1.—Preparation of 5,6-dihydro-6-oxo-pyrido[2,3-b][1,4] benzoxazepine A mixture consisting of 80 gm. (0.62 mol) of 2-chloro-3-amino-pyridine, 86 gm. (0.4 mol) of phenyl salicylate and 80 cc. of trichlorobenzene was heated at its boiling point for one hour, accompanied by stirring and bubbling nitrogen therethrough. The phenol liberated by the reaction was continuously distilled off; the liberated gaseous hydrogen chloride was absorbed in a receiver charged with aqueous sodium hydroxide. Thereafter, while it was still hot, the reaction mixture was poured into about 400 cc. of ethanol, and the resulting ethanolic solution was allowed to cool. The substance which had crystallized out during the cooling period was separated and was recrystallized from tetrahydronaphthalene. White, brilliant leaflets having a melting point of 280–282° C. was obtained. The product was identified to be 5,6-dihydro-6-oxopyrido[2,3-b][1,4]benzoxazepine of the formula

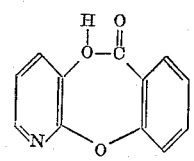

*Analysis.*—C₁₂H₈N₂O₂; mol. wt. 212.2. Calculated: C, 67.92%; H, 3.80%; N, 13.20%. Found: C, 68.05%; H, 3.99%; N, 12.90.

The same product was obtained when the raw reaction product was recrystallized from n-butanol or acetonitrile.

Example 2.—Preparation of 5,6-dihydro-6-oxopyrido [2,3-b][1,4]benzoxazepine through the intermediate 2-chloro-3-(2'-hydroxy-benzoylamino)-pyridine (a) 62.5 gm. (0.4 mol) of salicyclic acid chloride were dissolved in 500 cc. of absolute benzene, and the resulting solution was added dropwise at room temperature to a solution of 52 gm. (0.4 mol) of 2-chloro-3-amino-pyridine in 500 cc. of benzene, accompanied by stirring. After all of the salicyclic acid chloride solution had been added, the reaction solution was refluxed for one hour. Thereafter, the reaction solution was extracted by shaking with dilute aqueous sodium hydroxide, the aqueous alkaline phase was separated and filtered through activated charcoal, and then carbon dioxide gas was passed through the filtrate. A precipitate was formed, which was isolated and recrystallized from isopropanol. The reaction product had a melting point of 193–195° C. (decomposition) and was identified to be 2-chloro-3-(2'-hydroxy-benzoylamino)-pyridine of the formula

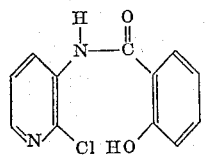

*Analysis.*—C₁₂H₉ClN₂O₂; mol. wt. 248.7. Calculated: C, 57.95%; H, 3.65%; Cl, 14.26%. Found: C, 57.65%; H, 3.74%; Cl, 14.18%.

(b) 10 gm. (0.04 mol) of 2-chloro-3-(2'-hydroxy-benzoylamino)-pyridine were dissolved in 10 cc. of aqueous potassium hydroxide [2.5 gm. (0.045 mol) potassium hydroxide in 10 cc. of water], and the resulting solution was evaporated to dryness in vacuo. The residue [the potassium salt of 2-chloro-3-(2'-hydroxy-benzoylamino)-pyridine] was then heated for three hours on an oil bath at 230–250° C. (bath temperature) while stirring and passing nitrogen through the vessel. Thereafter, the contents of the vessel were recrystallized from 1,2,3,4-tetra-hydronaphthalene. The purified product had a melting point of 280–282° C. and was found to be identical with the end product of Example 1.

(c) The ring closure conversion of the intermediate product obtained in (a) above into the end product of step (b) was also accomplished in the following manner:

11 gm. (0.044 mol) of 2-chloro-3-(2'-hydroxy-benzoylamino)-pyridine were dissolved in 150 cc. of an ethanolic potassium ethylate solution [2.0 gm. of potassium (0.051 gm.-atoms) in 150 cc. of absolute ethanol], and the resulting solution was evaporated to dryness in vacuo. 200 cc. of 1,2,3,4-tetrahydronaphthalene were poured over the residue, and the mixture was refluxed for five hours while stirring and passing nitrogen therethrough. While it was still hot, the reaction mixture was filtered, and the filtrate was allowed to cool. The crystalline precipitate formed thereby was isolated and recrystallized from 1,2,3,4-tetrahydronaphthalene. The product had a melting point of 280–282° C. and was found to be identical with the end product of Example 1.

Example 3

(a) 109 gm. (0.55 mol) of acetylsalicylic acid chloride were dissolved in 500 cc. of absolute toluene, and the resulting solution was added dropwise to a boiling solution of 71 gm. (0.55 mol) of 2-chloro-3-amino-pyridine in 1000 cc. of absolute toluene, accompanied by stirring. The resulting mixture was then refluxed for one hour and allowed to cool. A small amount of the intermediate product of Example 2(a) crystallized out, which was filtered off, and the filtrate was evaporated in vacuo.

The residue was recrystallized from n-butanol, yielding a substance composed of shiny silver leaflets having a melting point of 116–117° C. It was identified to be 2-chloro-3-(2'-acetoxy-benzoylamino)-pyridine of the formula

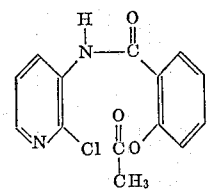

*Analysis.*—C₁₄H₁₁ClN₂O₃; mol. wt. 290.7. Calculated: C, 57.84%; H, 3.81%; Cl, 12.20%; N, 9.64%. Found: C, 57.80%; H, 3.79%; Cl, 12.50%; N, 9.42%.

(b) A mixture consisting of 5.8 gm. (0.02 mol) of 2-chloro-3-(2'-acetoxy-benzoylamino)-pyridine, 2.4 gm. (0.04 mol) of potassium hydroxide and 30 cc. of 1,2,3,4-tetrahydronaphthalene was heated for three hours on an oil bath at about 250° C. (bath temperature), accompanied by stirring and passing nitrogen through the mixture. Thereafter, an additonal 100 cc. of tetrahydronaphthalene were added, the mixture was briefly boiled and then filtered, and the filtrate was allowed to cool. A precipitate formed, which was separated and identified to be identical to the end product of Example 1.

Example 4.—Preparation of 5,6-dihydro-6-oxo-8-chloro-pyrido[2,3-b][1,4]benzoxazepine (a) 0.1 mol of 5-chloro-acetyl salicylic acid chloride and 0.1 mol of 2-chloro-3-amino-pyridine were refluxed for two hours in absolute xylene, as described in Example 3(a). Upon cooling of the reaction solution, a small amount of 2-chloro-3-(2'-hydroxy-5'-chloro-benzoylamino)-pyridine, M.P. 238–240° C. (recrystallized from ethanol), crystallized out. The precipitate was separated by filtration, the filtrate was evaporated in vacuo, and the residue was recrystallized from ethanol. A white crystalline substance was obtained which had a melting point of 119–120° C. It was identified to be 2-chloro-3-(2'-acetoxy-5'-chloro-benzoylamino)-pyridine of the formula

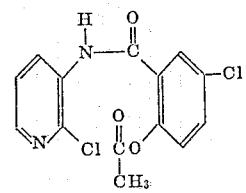

*Analysis.*—C₁₄H₁₀Cl₂N₂O₃; mol. wt. 325.2. Calculated: C, 51.71%; H, 3.10%; Cl, 21.81%; N, 8.62%. Found: C, 51.20%; H, 3.05%; Cl, 21.60%; N, 8.35%.

(b) The product obtained in (a) above was heated with potassium hydroxide and tetrahydronaphthalene as described in Example 3(b). The raw reaction product was recrystallized from ethanol, whereupon it had a melting point of 316–317° C. It was identified to be 5,6-dihydro-6-oxo-8-chloro-pyrido[2,3-b][1,4]benzoxazepine of the formula

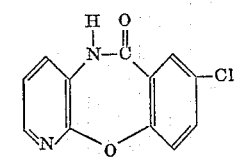

*Analysis.*—C₁₂H₇ClN₂O₂; mol. wt. 246.6. Calculated: C, 58.43%; H, 2.86%; N, 11.36%. Found: C, 58.30%; H, 3.03%; N, 11.16%.

Example 5.—Preparation of 5,6-dihydro-6-oxo-naphtho[2,3-f]pyrido[2,3-b][1,4]oxazepine (a) A solution of 6.4 gm. (0.05 mol) of 2-chloro-3-amino-pyridine and 9.7 gm. (0.1 mol) of pyridine in 50 cc. of absolute toluene was added dropwise to a solution of 12.4 gm. (0.05 mol) of 3-acetoxy-naphthoic acid chloride-(2) in 50 cc. of absolute toluene at 80° C. The resulting mixture was refluxed for eight hours and allowed to cool, and then 100 cc. of water were added. The organic phase was separated and evaporated in vacuo. The residue was admixed with an aqueous 20% solution of sodium hydroxide, the mixture was filtered, and the filtrate was acidified with hydrochloric acid. A precipitate was formed, which was separated and recrystallized from ethanol. The product had a melting point of 235–237° C. and was identified to be 2-chloro-3-(2'-hydroxy-naphthoylamino)-pyridine of the formula

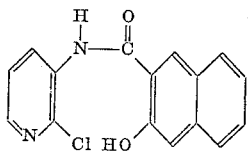

(b) 12 gm. of 2-chloro-3-(2'-hydroxy-naphthoylamino)-pyridine and 3.4 gm. of potassium hydroxide were dissolved in 200 cc. of absolute ethanol. 200 cc. of 1,2,3,4-tetrahydronaphthalene were added to the solution, and the ethanol was distilled off, whereby a suspension of the potassium salt of 2-chloro-3-(2'-hydroxy-naphthoylamino)-pyridine in tetrahydronaphthalene was formed. The suspension was refluxed for seven hours and was then filtered while still hot. The filtrate was allowed to cool, and the crystalline precipitate formed thereby was separated and recrystallized from dimethylformamide. The product had a melting point of 302–304° C. and was identified to be 5,6-dihydro-6-oxo-naphtho[2,3-f]pyrido[2,3-b][1,4]oxazepine of the formula

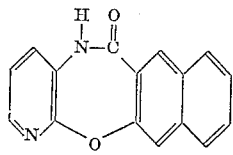

*Analysis.*—C₁₆H₁₀N₂O₂; mol. wt. 262.3 Calculated: C, 73.27%; H, 3.84%; N, 10.69%. Found: C, 73.50%; H, 3.84%; N, 10.70%.

Example 6.—Preparation of 5,6-dihydro-6-oxo-10-methyl-pyrido[2,3-b][1,4]benzoxazepine (a) 12.9 gm. (0.1 mol) of 2-chloro-3-amino-pyridine and 19.4 gm. (0.1 mol) of 2-acetoxy-3-methyl-benzoic acid were dissolved in 200 cc. of warm absolute toluene. The solution was heated to the boiling point and, while stirring, a solution of 15.5 gm. (0.13 mol) of thionyl chloride in 50 cc. of toluene was added slowly dropwise to the boiling solution. Thereafter, the reaction mixture was refluxed for one hour, allowed to cool, and then a solution of 16 gm. (0.4 mol) of sodium hydroxide in 100 cc. of water was added. The mixture was refluxed for thirty minutes accompanied by vigorous stirring, allowed to cool, and the two liquid phases were separated. The toluene phase was extracted with dilute sodium hydroxide. The combined alkaline aqueous phases were filtered through activated charcoal. Carbon dioxide was passed through the filtrate, whereby a precipitate was formed which was recrystallized first from isopropanol and then from cyclohexane. The product had a melting point of 140–142° C. and was identified to be 2-chloro-3-(2'-hydroxy-3'-methylbenzoylamino)-pyridine of the formula

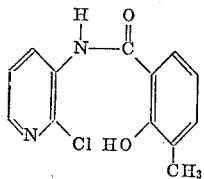

*Analysis.*—C₁₃H₁₁ClN₂O₂; mol. wt. 262.7 Calculated: C, 59.43%; H, 4.22%; N, 10.66%; Cl, 13.50%. Found: C, 59.70%; H, 4.26%; N, 10.50%; Cl, 13.28%.

(b) The product obtained in (a) above was treated with potassium ethylate and heated in tetrahydronaphthalene, as described in Example 2(c). Recrystallized from toluene, the reaction product had a melting point of 217–219° C. It was identified to be 5,6-dihydro-6-oxo-10-methyl-pyrido[2,3-b][1,4]benzoxazepine of the formula

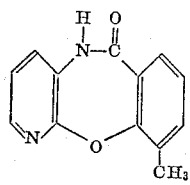

*Analysis.*—C₁₃H₁₀N₂O₂; mol. wt. 226.2. Calculated: C, 69.01%; H, 4.46%; N, 12.38%. Found: C, 58.70%; H, 4.51%; N, 12.30%.

Example 7.—Preparation of 5,6-dihydro-6-oxo-8-tert.butyl-pyrido[2,3-b][1,4]benzoxazepine (a) Using a procedure analogous to that described in Example 6(a), 2-chloro-3-(2'-hydroxy-5'-tert.butyl-benzoylamino)-pyridine, M.P. 154–156° C. (recrystallized from gasoline), was prepared from 2-chloro-3-amino-pyridine and 2-hydroxy-5-tert.butyl-benzoic acid.

*Analysis.*—C₁₆H₁₇ClN₂O₂; mol. wt. 304.08. Calculated: C, 63.05%; H, 5.62%; N, 9.19%; Cl, 11.63%. Found: C, 63.00%; H, 5.83%; N, 9.20%; Cl, 11.60%.

(b) The intermediate product obtained in (a) above was treated with potassium ethylate and heated in a mixture of tetrahydronaphthalene and quinoline (1:1), as described in Example 2(c). After completion of the heat treatment the reaction mixture was filtered while it was still hot, the filtrate was evaporated in vacuo, and the residue was recrystallized first from gasoline and then from isopropanol. The product had a melting point of 197–199° C. and was identified to be 5,6-dihydro-6-oxo-8-tert.butyl-pyrido[2,3-b][1,4]benzoxazepine of the formula

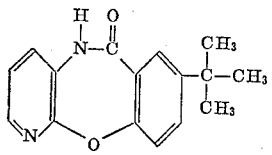

*Analysis.*—C₁₆H₁₆N₂O₂; mol. wt. 268.3. Calculated: C, 71.62%; H, 6.01%; N, 10.45%. Found: C, 71.30%; H, 5.85%; N, 10.46%.

Example 8.—Preparation of 5,6-dihydro-6-oxo-9-methoxy-pyrido[2,3-b][1,4]benzoxazepine (a) Using a procedure analogous to that described in Example 6(a), except that absolute dioxane was used as the solvent medium in place of toluene, 2-chloro-3-(2'-hydroxy-4'-methoxy-benzoylamino)-pyridine, M.P. 193.5° C. (recrystallized from acetonitrile), was prepared from 2-chloro-3-amino-pyridine and 2-hydroxy-4-methoxybenzoic acid.

*Analysis.*—C₁₃H₁₁ClN₂O₃; mol. wt. 278.7. Calculated: C, 56.67%; H, 3.98%; Cl, 12.72%; N, 10.05%. Found: C, 56.60%; H, 4.09%; Cl, 12.73%; N, 9.89%.

(b) The intermediate product obtained in (a) above was treated with potassium ethylate and heated in quinoline, as described in Example 2(c). Recrystallized from dimethyl formamide, the reaction product had a melting point of 313° C. It was identified to be 5,6-dihyro-6-oxo- 9-methoxy-pyrido[2,3-b][1,4]benzoxazepine of the formula

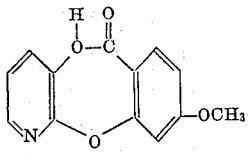

*Analysis.*—$C_{13}H_{10}N_2O_3$; mol. wt. 242.2. Calculated: C, 64.40%; N, 4.16%; N, 11.56%. Found: C, 64.30%; H, 4.42%; N, 11.70%.

Example 9.—Preparation of 5,6-dihydro-6-oxo-8-acetamino-pyrido[2,3-b][1,4]benzoxazepine (a) Using a procedure analogous to that described in Example 8(a), 2-chloro-3-(2'-hydroxy-5'-acetamino-benzoylamino)-pyridine, M.P. 197–199° C. (recrystallized from aqueous 50% dimethylformamide), was prepared from 2-chloro-3-amino-pyridine and 5-acetamino-salicylic acid.

*Analysis.*—$C_{14}H_{12}ClN_3O_3$; mol. wt. 305.7. Calculated: C, 55.00%; H, 3.96%; N, 13.75%; Cl, 11.61%. Found: C, 54.85%; H, 4.18%; N, 13.62%; Cl, 11.50%.

(b) The intermediate product obtained in (a) above was treated with potassium ethylate and heated in quinoline, as described in Example 2(c). The reaction product had a melting point of 311–312.5° C. (recrystallized from aqueous 50% dimethylformamide). It was identified to be 5,6-dihydro-6-oxo-8-acetamino-pyrido[2,3-b][1,4]benzoxazepine of the formula

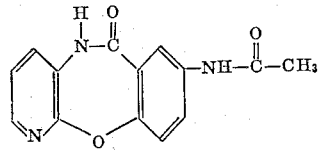

*Analysis.*—$C_{14}H_{11}N_3O_3$; mol. wt. 269.3. Calculated: C, 62.45%; H, 4.12%; N, 15.61%. Found: C, 62.30%; H, 4.33%; N, 15.61%.

Example 10.—Preparation of 5,6-dihydro-6-oxo-8-amino-pyrido[2,3-b][1,4]benzoxazepine 1 gm. of 5,6-dihydro-6-oxo-8-acetamino-pyrido[2,3-b][1,4]benzoxazepine (the product of Example 9) was dissolved in 40 cc. of aqueous 10% hydrochloric acid, and the resulting solution was stirred for forty-five minutes at 80° C. The reaction solution was allowed to cool, the cool solution was filtered, and the filtrate was adjusted to a pH of 8 with sodium hydroxide. The precipitate formed thereby was separated by filtration and was recrystallized from aqueous dimethylformamide. The product had a melting point of 285–287° C. and was identified to be 5,6-dihydro-6-oxo-8-amino-pyrido[2,3-b][1,4]benzoxazepine of the formula

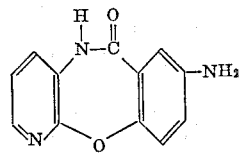

*Analysis.*—$C_{12}H_9N_3O_2$; mol. wt. 227.2. Calculated: C, 63.43%; H, 3.99%; N, 18.49%. Found: C, 63.30%; H, 4.17%; N, 18.50%.

Example 11.—Preparation of 5,6-dihydro-6-oxo-9-amino pyrido[2,3-b][1,4]benzoxazepine 46.0 gm. (0.3 mol) of 4-amino-salicylic acid and 39.0 gm. (0.3 mol) of 2-chloro-3-amino-pyridine were stirred with 300 cc. of absolute dioxane, and the resulting suspension was admixed with 15.0 gm. (0.11 mol) of phosphorus trichloride. The resulting mixture was heated for one hour at 100° C., and was then allowed to cool. The precipitate formed thereby was separated by filtration, dissolved in dilute sodium hydroxide and reprecipated by passing carbon dioxide through the solution. The intermediate product thus obtained, 2-chloro-3-(2'-hydroxy-4'-amino-benzoylamino)-pyridine, was treated with potassium ethylate and heated in quinoline, as described in Example 8(b). Recrystallized from aqueous pyridine, the product had a melting point of 328° C. (decomposition). It was identified to be 5,6-dihydro-6-oxo-9-amino-pyrido [2,3-b][1,4]benzoxazepine of the formula

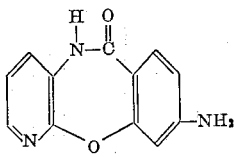

*Analysis.*—$C_{12}H_9N_3O_2$; mol. wt. 227.2. Calculated: C, 63.43%; H, 3.99%; N, 18.49%. Found: C, 63.65%; H, 3.98; N, 18.72%.

Example 12.—Preparation of 5,6-dihydro-6-oxo-8-acetyl-pyrido[2,3-b][1,4]benzoxazepine Using a procedure analogous to that described in Example 6, 5,6-dihydro-6-oxo-8-acetyl-pyrido[2,3-b][1,4]benzoxazepine, M.P. 305° (recrystallized from 1,2,3,4-tetrahydronaphthalene), of the formula

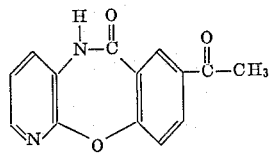

was prepared from 2-chloro-3-amino-pyridine and 5-acetyl-salicylic acid.

*Analysis.*—$C_{14}H_{10}N_2O_3$; mol. wt. 254.2. Calculated: C, 66.13%; H, 3.97%; N, 11.02%. Found: C, 66.25%; H, 4.11%; N, 10.88%.

The compounds according to the present invention, that is, those embraced by Formula I above, have useful pharmacodynamic properties. More particularly, they exhibit antipyretic, antiphlogistic, sedative and analgesic properties in warm-blooded animals.

In addition, the compounds of the present invention are useful as intermediates in the preparation of other derivatives of 5,6-dihydro-6-oxo-pyridol[2,3-b][1,4]benzoxazepines, namely, 5-alkyl- and 5-aminoalkyl-substituted derivatives, which exhibit antipyretic, histaminolytic, reserpine-antagonistic, sedative, antiphlogistic, analgesic and antiemetic properties. These 5-substituted derivatives above referred to are prepared by converting a compound of the Formula I into a corresponding 5-alkali metal compound according to known methods, which is then reacted with an alkylhalide or an aminoalkylhalide.

For pharmaceutical purposes the compounds according to the present invention are administered orally or parenterally as active ingredients in customary dosage unit compositions, that is, compositions in dosage unit form consisting essentially of an inert pharmaceutical carrier and one dosage unit of the active ingredient, such as tablets, coated pills, syrups, solutions, suspensions, capsules, suppositories and the like. One dosage unit of the compounds according to the present invention is from 10 to 200 mgm., preferably 30 to 50 mgm.

Dosage unit compositions comprising a compound of the present invention as an active ingredient may also contain one or more additional active ingredients which supplement or potentiate the action of the pyridobenzoxazepine ingredient, especially an analgesic or sedative, such as a codeine acid addition salt, 5-phenyl-5-ethyl-barbituric acid or the like.

The following examples illustrate a few dosage unit compositions comprising a compound of the present invention as an active antipyretic ingredient. The parts are parts by weight unless otherwise specified.

Example 13.—Tablets

The tablet composition is compounded from the following ingredients:

| | Parts |
|---|---|
| 5,6-dihydro-6-oxo-pyrido [2,3-b] [1,4]benzoxazepine | 30.0 |
| Secondary calcium phosphate | 60.0 |
| Potato starch | 31.0 |
| Polyvinylpyrrolidone | 4.0 |
| Talcum | 4.0 |
| Magnesium stearate | 1.0 |
| Total | 130.0 |

*Compounding procedure.*—The pyridobenzoxazepine compound, the calcium phosphate and the potato starch are thoroughly admixed with each other, the mixture is moistened with an aqueous 17.5% solution of the polyvinylpyrrolidone, and the moist mass is forced through a 1.0 mm.-mesh screen. The moist granulate thus obtained is dried at 45° C. and again passed through the screen. The dry granulate is admixed with the talcum and the magnesium stearate, and the mixture is pressed into 130 mgm.-tablets. Each tablet contains 30 mgm. of the active ingredient.

Example 14.—Coated Pills

The pill core composition is compounded from the following ingredients:

| | Parts |
|---|---|
| 5,6-dihydro-6-oxo - 10-methyl-pyrido[2,3-b] [1,4] benzoxazepine | 50.0 |
| Lactose | 37.0 |
| Corn starch | 30.0 |
| Gelatin | 2.0 |
| Magnesium stearate | 1.0 |
| Total | 120.0 |

*Compounding procedure.*—The pyridobenzoxazepine compound, the lactose and the corn starch are thoroughly admixed with each other, the mixture is moistened with an aqueous 10% solution of the gelatin, and the moist mass is forced through a 1 mm.-mesh screen. The moist granulate thus obtained is dried at 45° C. and again passed through the screen. The dry granulate is admixed with the magnesium stearate, and the mixture is pressed into 120 mgm.-pill cores, which are then coated with a thin shell consisting essentially of talcum and sugar. The coated pills are finally polished with beeswax. Each pill contains 50 mgm. of the active ingredient.

Example 15.—Syrup

The syrup composition is compounded from the following ingredients:

| | Parts |
|---|---|
| 5,6 - dihydro - 6 - oxo - 10 - methyl - pyrido[2,3-b][1,4]benzoxazepine | 0.5 |
| Codeine hydrochloride | 0.1 |
| N - (2 - amino - 3,5 - dibromobenzyl) - N - methyl - cyclohexylammoniumchloride | 0.5 |
| Sodium benzoate | 0.2 |
| Tartaric acid | 0.4 |
| Sodium hydroxide | 0.1 |
| Carboxymethyl cellulose, high viscosity | 0.1 |
| Saccharin sodium | 0.1 |
| Menthol | 0.015 |
| Flavoring | 0.03 |
| Certified food color | 0.02 |
| Ethanol | 5.0 |
| Sugar | 55.0 |
| Distilled water, q.s.ad by vol. | 100.0 |

*Compounding procedure.*—40 parts of distilled water are heated to 80° C., and a mixture of the carboxymethyl cellulose and the sugar are dissolved therein. The solution is then cooled (solution 1). The tartaric acid, the sodium hydroxide and the codeine hydrochloride are dissolved in 10 parts of distilled water (solution 2). The menthol is dissolved in a mixture of the ethanol and the flavoring (solution 3). The sodium benzoate, the saccharin sodium and the certified food color are dissolved in the remaining amount of distilled water (solution 4).

Solution 2, solution 4 and solution 3 are added in that order to solution 1. The resulting syrup is filtered through a suitable filter, and then the pulverized pyridobenzoxazepine compound is added thereto. The finished syrup is homogenized. 10 cc. of syrup contain 10 mgm. of codeine hydrochloride and 50 mgm. of the pyridobenzoxazepine compound.

Example 16.—Coated pills with codeine phosphate

The pill core composition is compounded from the following ingredients:

| | Parts |
|---|---|
| 5,6 - dihydro - 6 - oxo - pyrido[2,3 - b][1,4]benzoxazepine | 30 |
| Codeine phosphate | 10.0 |
| Lactose | 45.0 |
| Corn starch | 30.0 |
| Polyvinylpyrrolidone | 4.0 |
| Magnesium stearate | 1.0 |
| Total | 120.0 |

*Compounding procedure.*—The pyridobenzoxazepine compound, the codeine phosphate, the lactose and the corn starch are thoroughly admixed with each other, the mixture is moistened with an ethanolic 15% solution of the polyvinylpyrrolidone, and the moist mass is forced through a 1 mm.-mesh screen. The moist granulate obtained thereby is dried at 40° C. and is again passed through the screen. The dry granulate is then admixed with the magnesium stearate, and the mixture is pressed into 120 mgm.-pill cores, which are subsequently coated with a thin shell consisting essentially of talcum and sugar. The finished coated pills are finally polished with beeswax. Each pill contains 30 mgm. of the pyridobenzoxazepine compound and 10 mgm. of codeine phosphate.

Example 17.—Children's suppositories

The suppository composition is compounded from the following ingredients:

| | Parts |
|---|---|
| 5,6 - dihydro - 6 - oxo - pyrido[2,3 - b][1,4]benzoxazepine | 30.0 |
| Cocoa butter | 970.0 |
| Total | 1000.0 |

*Compounding procedure.*—The cocoa butter is melted at 45° C., the finely powdered pyridobenzoxazepine compound is stirred in, and the mixture is homogenized at 35° C. Thereafter, the composition is poured into cooled suppository molds, each holding 1000 mgm. of the composition. Each suppository contains 30.0 mgm. of the active ingredient.

Example 18.—Suppositories with phenobarbital

The suppository composition is compounded from the following ingredients:

| | Parts |
|---|---|
| 5,6 - dihydro - 6 - oxo - pyrido[2,3 - b][1,4]benzoxazepine | 60.0 |
| 5 - phenyl - 5 - ethyl - barbituric acid | 20.0 |
| Cocoa butter | 1620.0 |
| Total | 1700.0 |

*Compounding procedure.*—The cocoa butter is melted at 45° C., the finely powdered pyridobenzoxazepine compound and barbituric acid compound are stirred in, and the mixture is homogenized at 35° C. Thereafter, the composition is poured into cooled suppository molds, each holding 1700 mgm. of the composition. Each suppository contains 60 mgm. of the pyridobenzoxazepine compound and 20.0 mgm. of phenobarbital.

Example 19.—Aqueous suspension for oral administration to children

The suspension is compounded from the following ingredients:

| | Parts |
|---|---|
| 5,6 - dihydro - 6 - oxo - 10 - methyl - pyrido[2,3-b][1,4]benzoxazepine | 0.4 |
| Carboxymethyl cellulose, high viscosity | 0.4 |
| Colloidal silicic acid | 1.5 |
| p-Hydroxybenzoic acid methyl ester | 0.07 |
| p-Hydroxybenzoic acid propyl ester | 0.03 |
| Essence of cocoa | 1.5 |
| Sugar | 22.0 |
| Glycerin | 10.0 |
| Distilled water, q.s.ad by vol. | 100.0 |

*Compounding procedure.*—The distilled water is heated to 80° C., the p-hydroxybenzoic acid esters are dissolved therein, and the colloidal silicic acid is stirred into the solution. Thereafter, a mixture of the sugar and the carboxymethyl cellulose is dissolved in the aqueous mixture, and the composition is cooled to room temperature. Thereafter, the glycerin and the essence of cocoa are added and the pyridobenzoxazepine compound is stirred in, and the entire mixture is homogenized. 5 cc. of the resulting suspension contain about 20 mgm. of the active ingredient.

Although the above dosage unit composition examples illustrate only two specific compounds of the present invention as active ingredients, it should be understood that any of the other compounds embraced by Formula I may be substituted for the pyridobenzoxazepine ingredient in Examples 13 through 19. Similarly, the amount of the active ingredient may be varied within the dosage unit limits set forth above, as may the amount and nature of the inert ingredients.

While the present invention has been illustrated with the aid of certain specific examples, it will be readily apparent to others skilled in the art that the invention is not limited to these particular examples and that various changes and modifications may be made without departing from the spirit of the invention or the scope of the appended claims.

I claim:
1. A compound of the formula

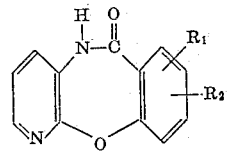

wherein $R_1$ and $R_2$ are each selected from the group consisting of hydrogen, halogen, lower alkyl, lower alkoxy, lower alkanoyloxy, amino, lower alkanoylamino, lower alkanoyl and, together with each other and adjacent carbon atoms of the benzene ring to which they are attached, a benzo ring.

2. A compound of a formula selected from the group consisting of

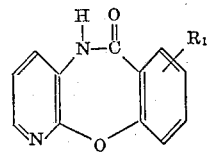

and

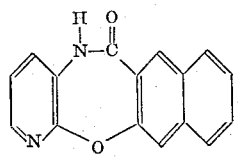

wherein $R_1$ is selected from the group consisting of hydrogen, halogen, lower alkyl, lower alkoxy, lower alkanoyloxy, amino, lower alkanoyl amino and lower alkanoyl.

3. A compound of the formula

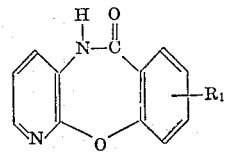

wherein $R_1$ is selected from the group consisting of hydrogen, chlorine, alkyl of 1 to 4 carbon atoms, methoxy, amino, acetamino and acetyl.

4. A compound of the formula

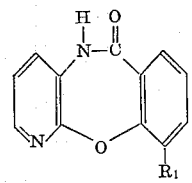

wherein $R_1$ is selected from the group consisting of hydrogen and methyl.

5. 5,6 - dihydro - 6 - oxo-pyrido[2,3-b][1,4]benzoxazepine.
6. 5,6 - dihydro - 6 - oxo-8-chloro-pyrido[2,3-b][1,4]benzoxazepine.
7. 5,6 - dihydro - 6 - oxo-naphtho[2,3-f]pyrido[2,3-b][1,4]benzoxazepine.
8. 5,6 - dihydro - 6 - oxo-10-methyl-pyrido[2,3-b][1,4]benzoxazepine.
9. 5,6 - dihydro - 6 - oxo - 8 - tert.butyl-pyrido[2,3-b][1,4]benzoxazepine.
10. 5,6 - dihydro - 6 - oxo - 9 - methoxy-pyrido[2,3-b][1,4]benzoxazepine.
11. 5,6 - dihydro - 6 - oxo-8-acetamino-pyrido[2,3-b][1,4]benzoxazepine.
12. 5,6 - dihydro - 6 - oxo-8-amino-pyrido[2,3-b][1,4]benzoxazepine.
13. 5,6 - dihydro - 6 - oxo-9-amino-pyrido[2,3-b][1,4]benzoxazepine.
14. 5,6 - dihydro - 6 - oxo-8-acetyl-pyrido[2,3-b][1,4]benzoxazepine.
15. The process of preparing a compound of the formula

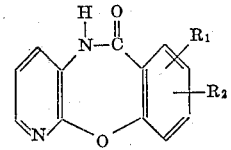

wherein $R_1$ and $R_2$ are each selected from the group consisting of hydrogen, halogen, lower alkyl, lower alkoxy, hydroxyl, acyloxy, amino, acylamino, acyl and, together with each other and adjacent carbon atoms of the benzene ring to which they are attached, an aromatic ring, which comprises reacting a 2-halo-3-amino-pyridine of the formula

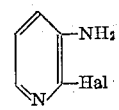

wherein Hal is halogen, with a reactive derivative of a salicylic acid compound of the formula

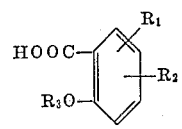

wherein $R_1$ and $R_2$ have the meanings previously defined and $R_3$ is selected from the group consisting of hydrogen and protective groups for phenolic hydroxyl, at a temperature above 150° C., and recovering the reaction product.

16. The process of preparing a compound of the formula

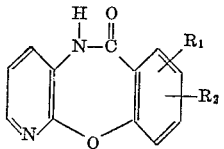

wherein $R_1$ and $R_2$ are each selected from the group consisting of hydrogen, halogen, lower alkyl, lower alkoxy, hydroxyl, acyloxy, amino, acylamino, acyl and, together with each other and adjacent carbon atoms of the benzene ring to which they are attached, an aromatic ring, which comprises reacting a 2-halo-3-amino-pyridine of the formula

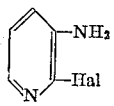

wherein Hal is halogen, with a reactive derivative of a salicylic acid compound of the formula

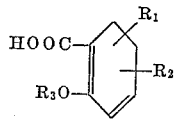

wherein $R_1$ and $R_2$ have the meanings previously defined and $R_3$ is selected from the group consisting of hydrogen and protective groups for phenolic hydroxyl, at a temperature between 0 and 150° C., to form an intermediate of the formula

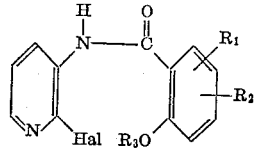

wherein $R_1$, $R_2$, $R_3$ and Hal have the meanings previously defined, heating said intermediate to a temperature above 150° C., and recovering the reaction product.

17. The process according to claim 15, wherein the reactive derivative of the salicylic acid compound is selected from the group consisting of lower alkyl esters, acyl esters, halides and anhydrides.

18. The process according to claim 16, wherein the reactive derivative of the salicylic acid compound is selected from the group consisting of lower alkyl esters, acyl esters, halides and anhydrides.

19. The process according to claim 15, wherein the reaction is carried out in the presence of an inert solvent having a high boiling point.

20. The process according to claim 16, wherein the reaction is carried out in the presence of an inert solvent having a high boiling point.

21. The process according to claim 16, wherein the intermediate is heated in the presence of a strong base.

References Cited

UNITED STATES PATENTS 3,337,536   8/1967   Schmutz et al. _____ 260—239.3

JOHN D. RANDOLPH, *Primary Examiner.*

WALTER A. MODANCE, *Examiner.*

R. T. BOND, *Assistant Examiner.*